W. A. HALL, Sr.
POTATO PLANTER.
APPLICATION FILED MAR. 28, 1907.
941,449.
Patented Nov. 30, 1909.
4 SHEETS—SHEET 2.
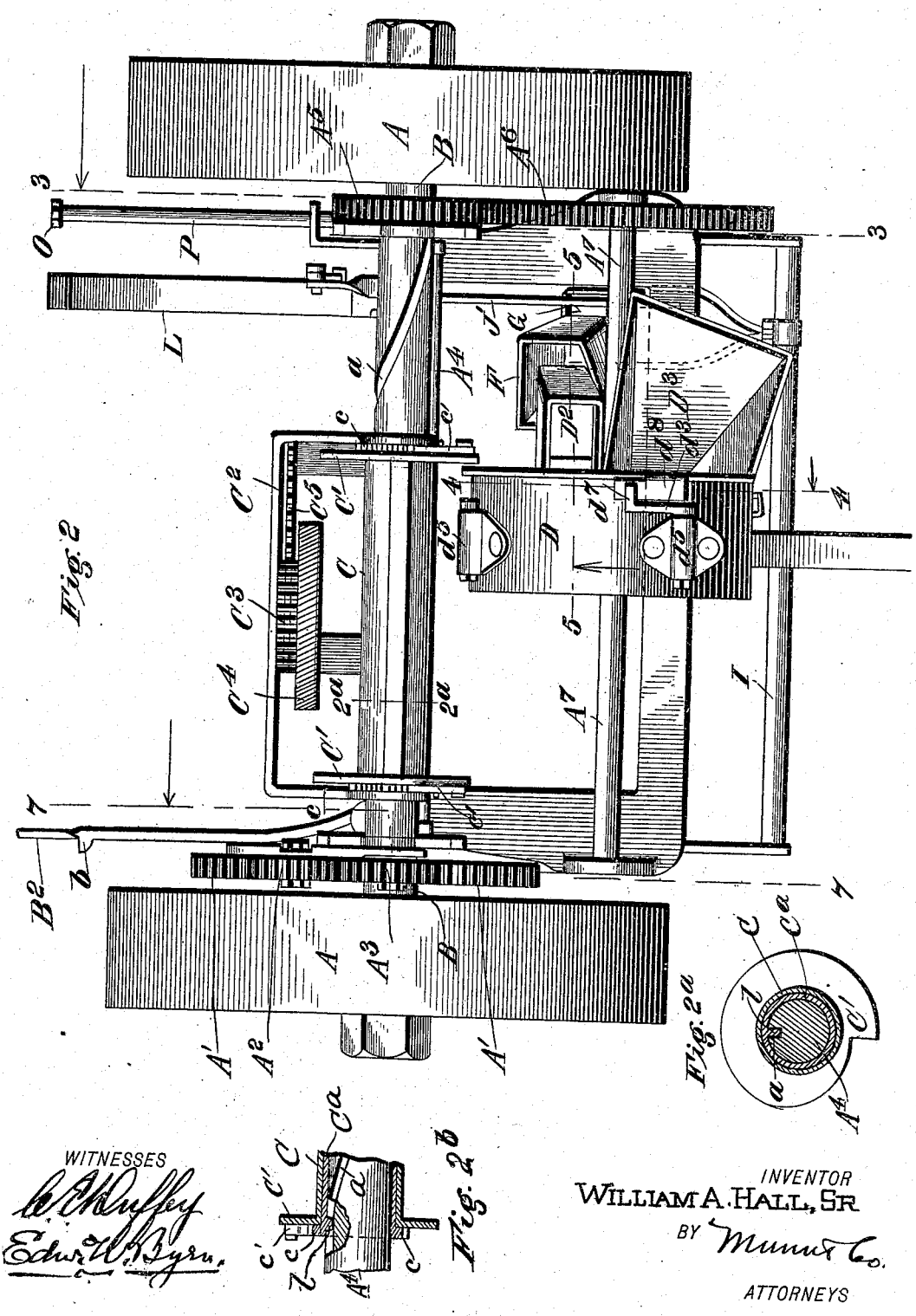
WITNESSES
INVENTOR
WILLIAM A. HALL, Sr.
BY
ATTORNEYS W. A. HALL, Sr.
POTATO PLANTER.
APPLICATION FILED MAR. 28, 1907.
941,449.
Patented Nov. 30, 1909.
4 SHEETS—SHEET 3.
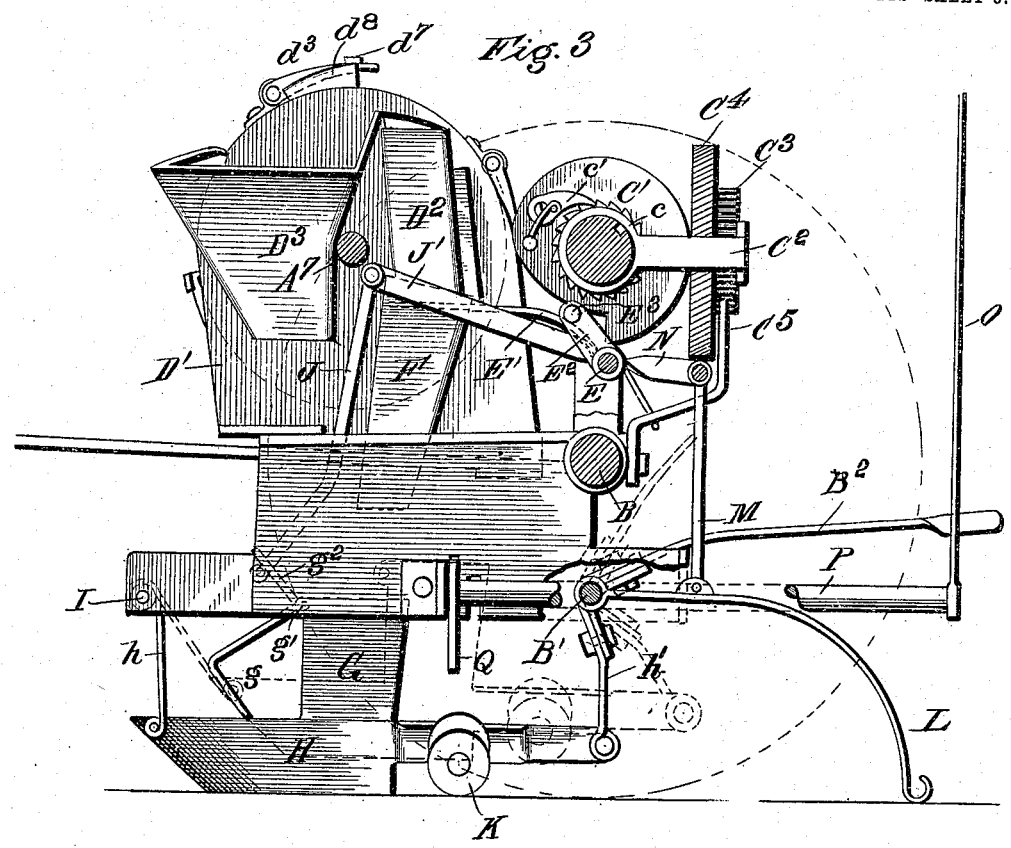
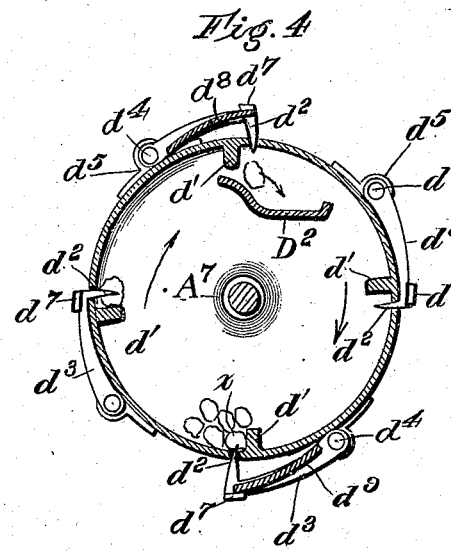
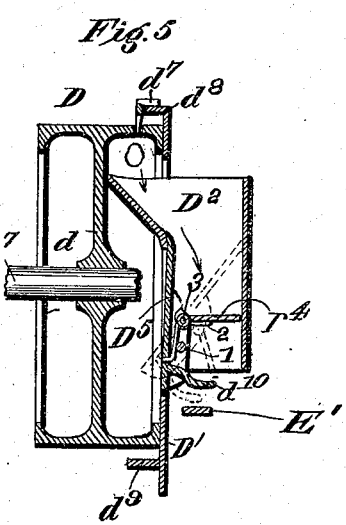
WITNESSES
INVENTOR
WILLIAM A. HALL, SR.
BY
ATTORNEY

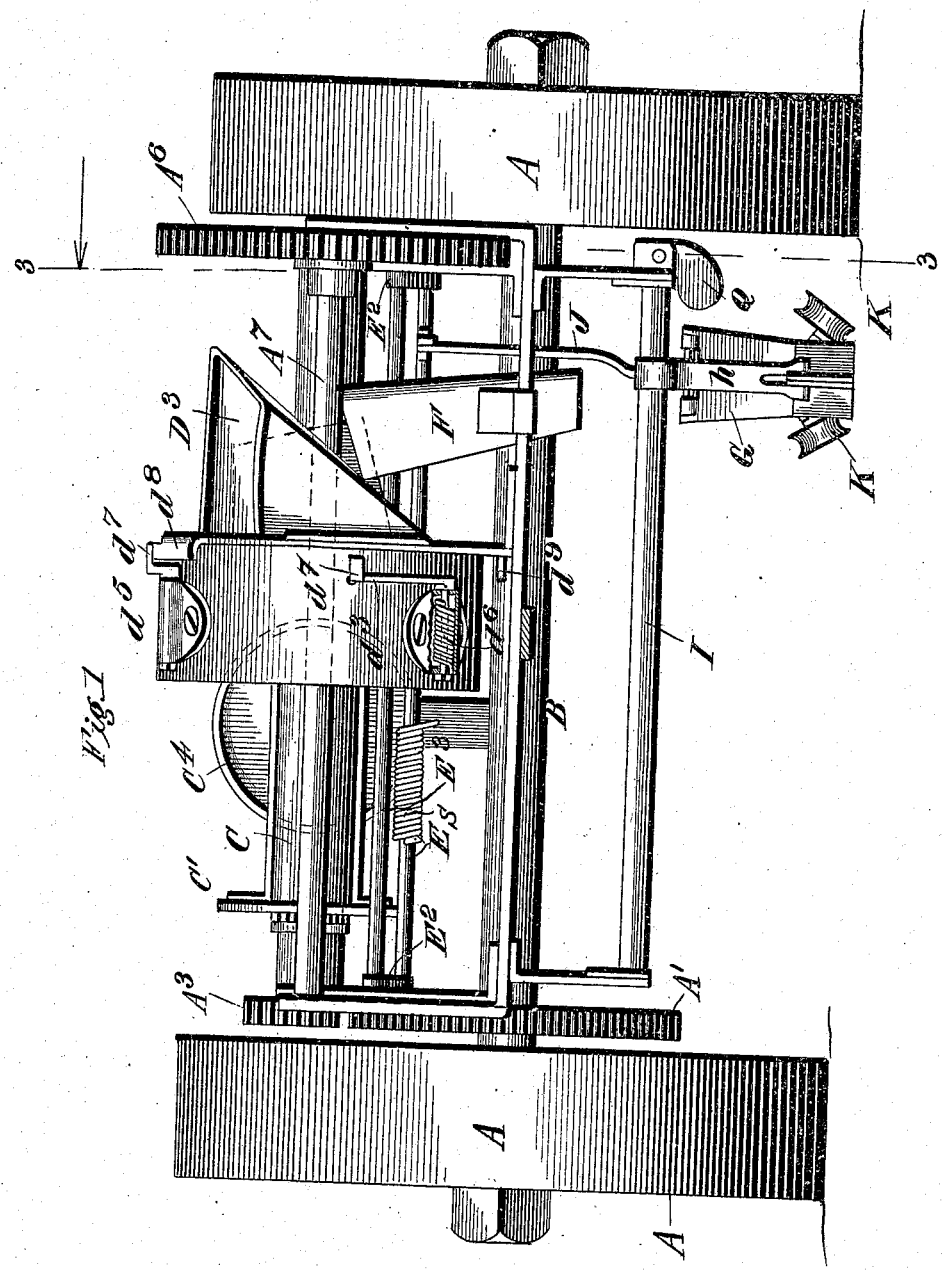

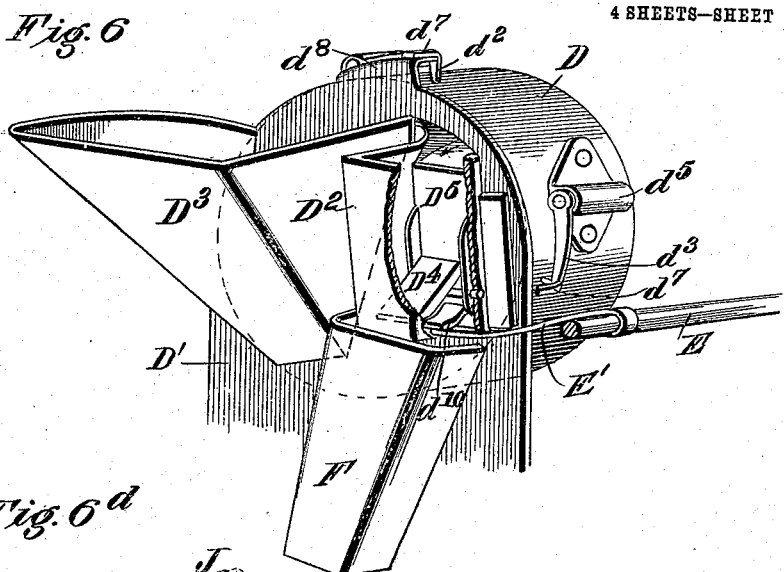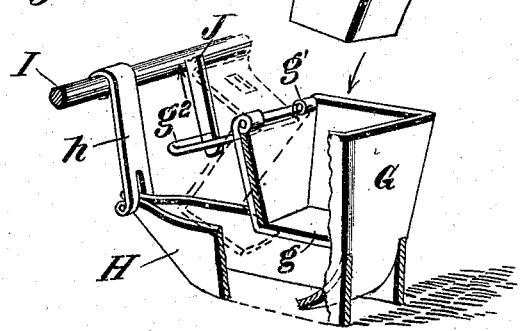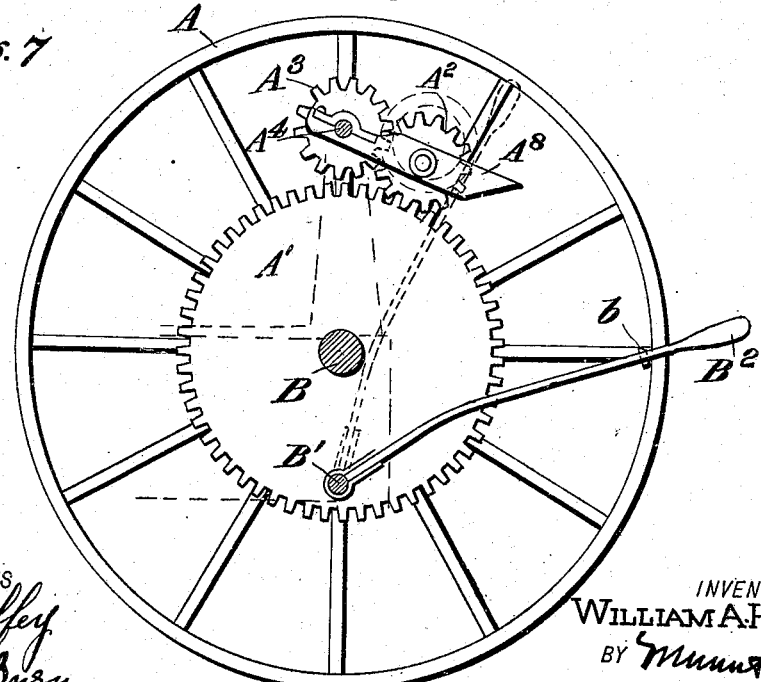

UNITED STATES PATENT OFFICE.

WILLIAM A. HALL, SR., OF PARDEEVILLE, WISCONSIN.

POTATO-PLANTER.

941,449.  Specification of Letters Patent.  Patented Nov. 30, 1909.

Application filed March 28, 1907. Serial No. 365,117.

*To all whom it may concern:*

Be it known that I, WILLIAM A. HALL, Sr., a citizen of the United States, residing at Pardeeville, in the county of Columbia and State of Wisconsin, have invented a new and useful Improvement in Potato-Planters, of which the following is a specification.

My invention is in the nature of an improvement on and simplification of the planter for which Letters Patent of the United States was granted me April 24, 1906, No. 818,956, and it consists in the novel construction and arrangement of parts as hereinafter shown and described with reference to the drawing, in which—

Figure 1 is a front elevation. Fig. 2 is a top plan view. Fig. 2$^a$ is a detail section on line 2$^a$—2$^a$ of Fig. 2, and Fig. 2$^b$ is a sectional detail at right angles to Fig. 2$^a$. Fig. 3 is a vertical section taken crosswise the axle on line 3—3 of Figs. 1 and 2, looking in the direction of the arrow. Fig. 4 is a sectional detail of the potato feeding devices, the section being taken on line 4—4 of Fig. 2. Fig. 5 is a sectional detail of the potato feeding devices, the section being taken on line 5—5 of Fig. 2. Fig. 6 is an external view, in perspective, of the potato feeding devices and Fig. 6$^a$ is a sectional perspective view of the receiving and planting devices immediately below the feeding devices and Fig. 7 is a vertical transverse section on line 7—7 of Fig. 2 looking in the direction of the arrow on this line.

Referring to Figs. 2 and 7, A, A, represent the two running or driving wheels, which run upon the ground and impart motion to the operative parts of the machine. One of these running wheels, see Fig. 7, has rigidly attached to it a large gear wheel A' which imparts a continuous rotary motion to a shaft A$^4$ through the two small gear wheels A$^2$ A$^3$. The gear wheel A$^3$ is rigidly attached to the shaft A$^4$ and is out of contact with the gear A', but in permanent gear with the small wheel A$^2$. This gear wheel A$^2$ is journaled in an adjustable frame A$^8$ hung on the shaft A$^4$ and adjustable about the same to bring the gear wheel A$^2$ into mesh with the large gear A', or take it out of contact therewith as shown in dotted lines in Fig. 7 when it is not desired to transmit the motion of the running wheels to the working parts. To throw the wheel A$^2$ out of gear, a lever B$^2$ is fixed to shaft B' parallel to and below the axle B and this lever has a lug $b$, see Fig. 2, which lug, when the lever B$^2$ is turned up into the dotted position in Fig. 7, strikes against the inclined end of the supporting frame A$^8$ and lifts it and the wheel A$^2$ so that the latter is out of contact with the main driving wheel A'.

Referring now to Fig. 2, the shaft A$^4$, to which the gear wheel A$^3$ is rigidly attached, is in constant rotation as long as the machine is at work and this shaft is formed with a spiral groove $a$. On its end opposite the gear wheel A$^3$ is another rigidly attached gear wheel A$^5$ which meshes with a larger gear wheel A$^6$ fixed to a shaft A$^7$ which turns the potato feeding devices carried by the hollow feed wheel or receptacle D as hereafter described. The spirally grooved shaft A$^4$ is surrounded by two sleeves C and C$^a$, Figs. 2$^a$ and 2$^b$. The inner sleeve C$^a$ has a lug $l$ near each end which travels in the spiral groove. On the outer ends of this sleeve are rigid ratchet wheels $c$. The outer sleeve has at its ends cams C', C', to which are pivoted pawls $c'$ engaging the ratchet. The two sleeves C and C$^a$ are retained within a yoke C$^2$, Fig. 2, hung upon shaft A$^4$ and bearing a gear wheel C$^3$ and an attached hand wheel C$^4$. The gear wheel C$^3$ travels along on a subjacent stationary cog track or rack bar C$^5$, so that when hand wheel C$^4$ is turned the gear C$^3$ rolls on the cog track C$^5$ and carries the yoke C$^2$ and the movable sleeves longitudinally over the spirally grooved shaft A$^4$ as described in my previous patent referred to and which it is not necessary to further describe except to say that as the sleeve C is adjusted longitudinally over the shaft the lugs $l$ on the sleeve traverse the spiral groove $a$, as described in my previous patent, and causes the sleeve C to partially rotate and turn the cams C' C' so that they act sooner or later on the dropping devices hereafter described. This provision is for the purpose of advancing or retarding the time of dropping potatoes while crossing the field should any roughness of ground or other cause throw the machine out of alinement with cross rows. I make no claim to these devices in this case as they are already shown described and claimed in my previous patent.

I will now describe the means for feeding and dropping the potatoes, one at a time, reference being had to Figs. 1, 2, 3, 4, 5, 6.

D, Fig. 2, is a hollow wheel or potato receptacle rigidly attached to the constantly rotating shaft $A^7$. This hollow wheel or receptacle is made double with a middle partition or web $d$, as seen in Fig. 5. This is for the purpose of dividing the wheel or receptacle into two compartments, one on each side of the partition $d$ for planting two rows at a time. I have illustrated, however, for simplicity sake, only means on one side of the wheel for planting one row, the other side to be similarly equipped for a second row. The right hand side of wheel D is closed in by a stationary side wall $D'$, beside which the wheel revolves. This stationary side wall $D'$ has a chute $D^2$ which on one side, projects into the wheel nearly to the middle partition $d$. The wheel, see Fig. 4, has projecting inwardly from its rim four, more or less, shelves $d'$ and beside these shelves are four spurs $d^2$ which play back and forth through holes in the rim of the wheel. These spurs are formed on the ends of arms $d^3$ having rocking axes $d^4$ parallel to the axis of wheel D and mounted in housings $d^5$ on the exterior of the rim of the wheel. Wound around the rocking axes $d^4$ are spiral springs $d^6$, Fig. 1, which tend to throw the spurs $d^2$ inwardly into the wheel. These spurs are intended to pierce a potato at the bottom of the wheel, carry it to the top of the wheel and then dislodge and drop it down the chute to be planted. This is accomplished as follows, reference being had to Figs. 1, 4 and 5. The arm of each potato engaging device has an offsetting lug $d^7$ which is arranged to ride on a stationary cam flange $d^9$ at the bottom and another one $d^8$ at the top. A hopper $D^3$ is arranged laterally on the stationary side wall $D'$ and opens at the bottom into the wheel so that seed potatoes emptied into this hopper pass into the wheel and drop to the bottom thereof at $x$, as seen in Fig. 4. As the wheel rotates in the direction of the arrow the shelves $d'$ always insure that a potato shall be directly above the lower spur $d^2$ and as the lug $d^7$ rides on the stationary cam $d^9$ the spur is pulled outwardly until it is out beyond the rim of the wheel. At this moment the further movement of the wheel causes the lug $d^7$ to pass off the outer end of the cam flange $d^9$, with the result that the spiral spring snaps the potato engaging device into the wheel and the spur, finding a potato, as at $x$, directly above it, impales it and carries it up as the wheel rotates. The other potatoes roll back over the shelf $d'$ and remain at the bottom of the wheel. As the potato which has been thus impaled reaches the top of the wheel it is dislodged and dropped as follows. The lug $d^7$ rides on the stationary cam $d^8$ and pulls the spur $d^2$ out of the wheel, leaving the potato to drop into the stationary chute $D^2$, as seen in Fig. 5. As the potato drops in the chute it falls upon a tilting bottom $D^4$ pivoted at 3 to a deflector $D^5$ pivoted at 1. A spiral spring 2 holds the bottom $D^4$ up with its end against the inside of chute $D^2$ so as to maintain deflector $D^5$ in a vertical position. When a potato falls on $D^4$ it is dropped down and also turns the deflector $D^5$ to the dotted position so that if a second potato drops it will be sent back over the top of the now inclined deflector $D^5$ into the wheel again. This prevents two potatoes from passing into the same hill. The tilting parts $D^4$ $D^5$ are restored to the position shown in full lines in Fig. 5 by a toe $d^{10}$ which is struck by a tappet arm $E'$, Figs. 3, 5 and 6, by the rocking of a shaft E to which said tappet arm is rigidly attached. The rock shaft E, Figs. 1 and 3, has at its ends rigidly attached arms $E^2$, $E^2$, whose outer ends are connected by a rod $E^3$ and on this rod $E^3$ the cams $C'$ press in rotating to rock the shaft E. As the rod $E^3$ Fig. 1 extends entirely across the machine it will be seen that the cams $C'$ can act upon the same, to rock the shaft E, no matter what position the sleeve C and cams $C'$ may occupy on the spirally grooved shaft $A^4$. The shaft E is rocked in one direction by the cams $C'$ and in the opposite direction by a spiral spring S seen in Fig. 1.

When the potato drops out of the chute $D^2$ it passes, see Figs. 3, 6 and 6a, into a guide spout F and thence down into receiving box G through the furrow opening plow H which latter has an open bottom. This furrow opening plow H and receiving box G are suspended by hanger bars $h$ $h'$. The front hanger bar $h$ is loosely connected to a front cross bar I stationarily fixed in the frame and the back hanger bar $h'$ is rigidly attached to a rear cross bar $B'$ which also carries the rigidly attached lever $B^2$. When this lever is down, the plow H is in the ground as in Fig. 3 and at work, and when the lever is up, as in dotted lines in Figs. 3 and 7, the plow H is lifted out of the ground and the gear wheels are disconnected. When the potato is received into the box G, see Fig. 6a, it is temporarily caught and held by a rocking shelf $g$ which is bent at right angles and is hung upon an axial shaft $g'$ at the front of the box and has a projecting arm $g^2$ in front to which is loosely hung the lower end of a lift bar J attached, see Fig. 3, to the forward end of an oscillating arm $J'$ rigidly fixed to the rock-shaft E, so that when the shaft E rocks backward it lifts arm $J'$ and bar J and pulling up on the arm $g^2$, draws the shelf $g$ forwardly and upwardly, as in full lines in Fig. 3 and dotted lines in Fig. 6a, thus dropping the potato through the open bottom of the boat-shaped plow. At the rear end of the boat-shaped plow there are two inclined wheels or grooved rollers K K, Figs. 1 and 3, which press the dirt up to and cover the potato.

As the shaft E rocks to drop the potato it also operates a marker for the row, which marker consists of a curved and rearwardly extending arm L, Fig. 3, loosely hung upon the horizontal shaft B'. This marker arm L is connected by a link bar M to an arm N rigidly connected to the rock shaft E so that as the shaft E rocks backward it forces arm N and link bar M down and causes the marker arm L to make a dent in the ground immediately over the last hill planted.

I provide also an indicator for enabling the operator to know if the cross rows are in line. This consists of an upright pointer arm O mounted on the rear end of a rock shaft P at right angles to and below the main axle and having a weighted arm Q at its forward end. If the pointer arm is right over the mark in the last row planted then the cross rows are in line, and if ahead or behind it is corrected by shifting sleeve C around the spirally grooved shaft as in my former patent.

I claim—

1. A dropping device for potatoes and the like, consisting of a hollow revolving wheel and one or more potato engaging devices consisting of a swinging arm with a spur on its end adapted to enter the wheel and having a laterally projecting lug and a rocking axis with spiral spring both arranged parallel to the axis of the wheel, and a stationary side plate for the wheel bearing upper and lower cams arranged to act alternately upon the lugs of the potato engaging devices to cause them to move back and forth into the wheel.

2. A dropping device for potatoes and the like, consisting of a hollow revolving wheel with means for selecting a potato at the bottom and dropping it at the top, a stationary chute entering the wheel and a movable valve bottom to the said chute having a deflector arranged to form a temporary passageway between the upper part of the chute and the bottom of the wheel when the valve bottom is opened.

3. The combination with the potato dropping wheel, and its discharge chute with movable valve bottom and chute deflector; of a restoring device for said valve bottom and chute deflector consisting of a tappet arm acting upon the said deflector and valve bottom, a rock shaft rigidly connected to the tappet arm and means for rocking the shaft.

4. In a planting device, the combination with the seed dropping and planting devices; of a rock shaft for actuating these parts having rigid arms and a rod connecting the outer ends of said arms and a rotary shaft with cams acting upon the said rod to rock the shaft in one direction and a spring for rocking it in the other direction.

5. In a planting device, the combination with the seed dropping devices; of a subjacent boat-shaped plow having an open bottom and a receiving box on top of it, an adjustable shelf at the bottom of said receiving box and means for connecting said shelf with the driving mechanism to positively tip the shelf at intervals.

WILLIAM A. HALL, Sr.

Witnesses:
 IRVINE GROVER,
 E. G. GROVER.